E. A. A. GRÖNWALL, A. R. LINDBLAD & O. STÅLHANE.
ELECTRIC FURNACE.
APPLICATION FILED MAR. 2, 1909.
1,039,732.
Patented Oct. 1, 1912.
Fig: 1.
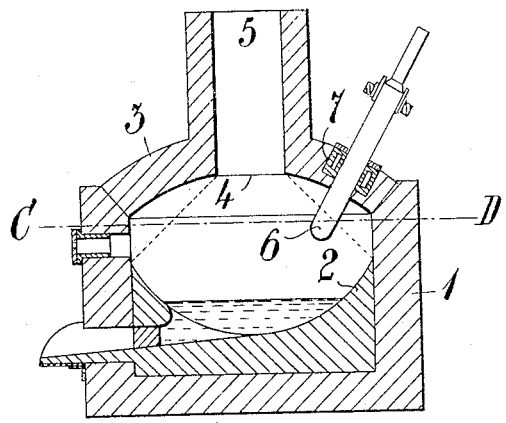
Fig: 2.
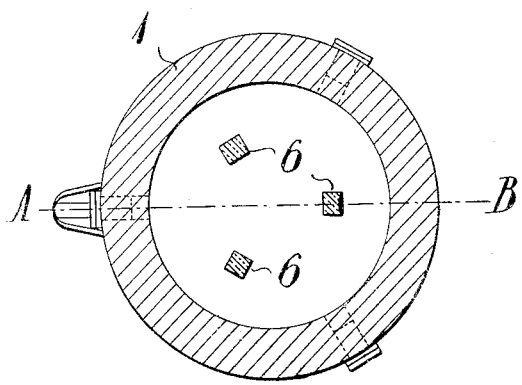
Witnesses:
Inventors:
Eugen Assar Alexis Grönwall,
Axel Rudolf Lindblad,
Otto Stålhane,
By their Attorney,

UNITED STATES PATENT OFFICE.

EUGEN ASSAR ALEXIS GRÖNWALL, AXEL RUDOLF LINDBLAD, AND OTTO STÅLHANE, OF LUDVIKA, SWEDEN.

ELECTRIC FURNACE.

1,039,732.      Specification of Letters Patent.      Patented Oct. 1, 1912.

Application filed March 2, 1909. Serial No. 480,833.

*To all whom it may concern:*

Be it known that we, EUGEN ASSAR ALEXIS GRÖNWALL, AXEL RUDOLF LINDBLAD, and OTTO STÅLHANE, engineers, residing at Ludvika, in the Kingdom of Sweden, have invented some new and useful Improvements in Electric Furnaces.

This invention has for its object the provision of an improved form of furnace whereby the electrodes are prevented from undue heating at the portion where they pass through the upper part or top of the smelting chamber, for immersion in the charge.

In the accompanying drawing illustrating one embodiment of our invention, Figure 1 is a vertical section on the line A—B indicated in Fig. 2, and Fig. 2 is a horizontal section on the line C—D indicated in Fig. 1.

Heretofore in furnaces of this type great difficulty has been experienced in properly protecting the electrodes where they pass through the upper portion or roof of the smelting chamber, and also in protecting the roof or top of the smelting chamber, from destruction from the intense heat generated in the chamber. In the present invention the smelting chamber is constructed whereby an annular free space is formed at the top of the smelting chamber above the charge introduced through the stack and extending up into the stack, and the electrodes are introduced into the upper portion of the smelting chamber so as to first pass through this free space, and then have the end portions immersed in the charge.

In the construction illustrated the smelting chamber of the furnace is formed by brick work 1 that may be provided with a suitable lining 2. The furnace is provided with a roof or cupola 3 that is shown as slightly arched, and supports a shaft 5 open into the smelting chamber at 4, through which the charge is introduced. When the charge is introduced through the stack 5, it will spread out in the furnace, but will leave an annular free space under the roof 3, as indicated by the broken line in Fig. 1. The electrodes 6 are introduced at the upper portion of the smelting chamber so that they do not directly enter the charge, but first pass through this annular free space, and then have their end portions projecting into and immersed in the charge. Preferably the electrodes 6 pass through the roof 3 of the smelting chamber, and may be provided with water cooled frames 7. These electrodes it will be seen have a considerable portion between their immersed ends, and the portion passing through the roof, that is exposed to the annular free space. This latter acts somewhat as a non-conductor, and will serve to prevent the intense heat of the smelting chamber from direct access to the roof, and to the portions of the carbons passing through the roof. Therefore the electrodes where passing through the roof will be of a much lower degree of heat, and both the electrodes and the roof will be protected and destruction thereof greatly reduced.

Having thus described our invention, we claim:

The combination in an electric furnace for reducing and smelting ores of a furnace chamber, which at its top is provided with means for introducing the charge to be treated and so formed that one or more free spaces always will exist between the upper part of the brickwork of the furnace chamber and the upper sloping surfaces of the charge, fed into the same, with electrodes entering obliquely inward through the cover of the chamber and through said free spaces into the charge to be treated.

In witness whereof we have hereunto set our hands in presence of two witnesses.

EUGEN ASSAR ALEXIS GRÖNWALL.
    AXEL RUDOLF LINDBLAD.
    OTTO STÅLHANE.

Witnesses:
    J. M. HELÉN,
    F. E. SCHULTZBERG.